United States Patent [19]

Crook et al.

[11] Patent Number: 5,646,780
[45] Date of Patent: Jul. 8, 1997

[54] OVERCOAT METHOD AND APPARATUS FOR $ZRO_2$ MIRROR STACKS

[75] Inventors: Thomas M. Crook, New Brighton; Randy J. Ramberg, Roseville, both of Minn.

[73] Assignee: Honeywell Inc., Minneapolis, Minn.

[21] Appl. No.: 655,663

[22] Filed: Jun. 3, 1996

Related U.S. Application Data

[63] Continuation of Ser. No. 295,328, Aug. 24, 1994, abandoned.

[51] Int. Cl.$^6$ .................... G02B 1/10; G02B 5/28
[52] U.S. Cl. ............... 359/584; 359/586; 359/589
[58] Field of Search .................... 359/580, 582, 359/584, 586, 588, 589

[56] References Cited

U.S. PATENT DOCUMENTS

| | | | |
|---|---|---|---|
| 4,260,222 | 4/1981 | Kozawa | 359/586 |
| 4,609,267 | 9/1986 | Deguchi et al. | 359/586 |
| 4,900,137 | 2/1990 | Carter | 359/584 |
| 4,934,788 | 6/1990 | Southwell | 359/586 |
| 4,940,636 | 7/1990 | Brock et al. | 359/586 |
| 4,952,025 | 8/1990 | Gunning, III | 359/586 |
| 5,358,776 | 10/1994 | Hotaling | 359/584 |
| 5,377,045 | 12/1994 | Wolfe et al. | 359/586 |
| 5,424,876 | 6/1995 | Fujii | 359/584 |

*Primary Examiner*—Jon W. Henry
*Attorney, Agent, or Firm*—Thomas A. Rendos

[57] ABSTRACT

A mirror for a ring laser gyro includes alternating optical quarterwave regions of $SiO_2$ and $ZrO_2$, and of admixtures of these. The alternating regions have thicknesses suitable for reflecting a laser beam in a ring laser gyro. A final coating of $ZrO_2$ and $SiO_2$, and of admixtures of these, is constructed so as to be made substantially of $ZrO_2$ at a bottom portion and so as to have gradually increasing $SiO_2$ content so that the top surface comprises substantially pure $SiO_2$ material.

14 Claims, 2 Drawing Sheets

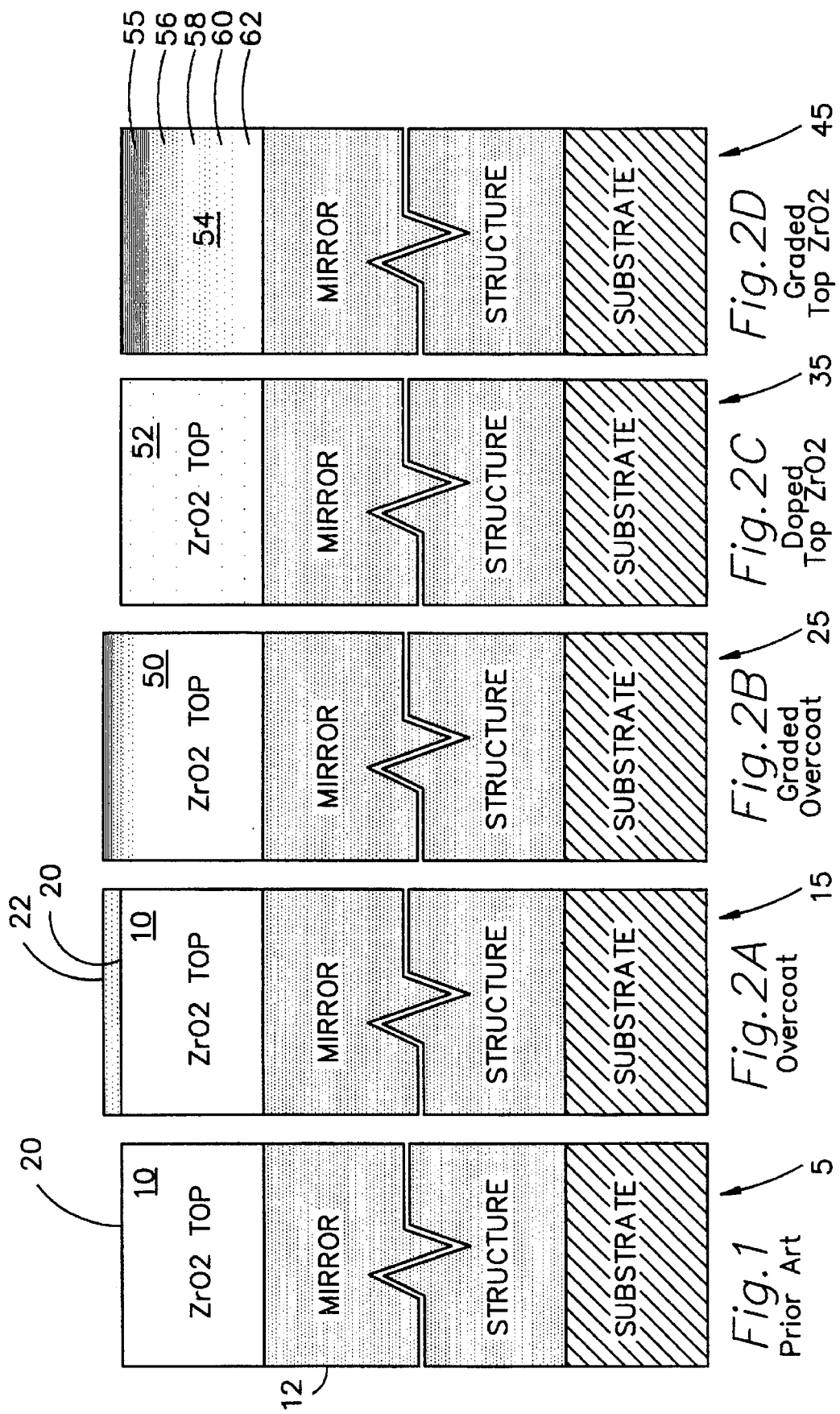

OVERCOAT METHOD AND APPARATUS FOR ZRO₂ MIRROR STACKS

This application is a continuation of application Ser. No. 08/295,328, filed Aug. 24, 1994 now abandoned.

BACKGROUND OF THE INVENTION

1. Field of the Invention

The present invention relates to overcoat methods for improving cleanability of high reflectance optical mirrors and, in particular, mirrors adapted for use in ring laser gyros.

2. Discussion of the Prior Art

To produce the very high reflecting mirrors needed for ring laser gyros, generally a number of optical regions of different refractive index materials are deposited onto suitable substrates. With a sufficient number of such optical regions, each appropriately thick, the reflectance of the resulting mirrors may be made acceptably high.

Conventional methods of fabricating these dielectric mirror stacks using typical sputtering techniques results in abrupt interfaces between each alternating optical region. In ion beam sputtering for example, ions are accelerated from a region in which they are generated (the ion beam source) by means of suitably electrified grids, and directed at high energies onto a target. On impact, material from the target is sputtered off, and subsequently received by suitably located substrates, resulting in the deposition of target material. These conventional procedures employ rapid transfers from one target material to another, interrupting the ion beam during target changes, or both. Such practices serve to increase the abruptness of the discontinuity of refractive index between layers.

U.S. Pat. No. 4,108,751, issued Aug. 27, 1978 to King, entitled "Ion Beam Implantation-Sputtering", discloses an ion beam apparatus wherein materials are deposited onto a substrate using a target which may be comprised of dual materials. King is directed toward a method of depositing a hard coating on a plastic lens. King angles the boundary of two materials on a target such that a continuous change in amounts of materials deposited can be attained as the location of the primary beam on the target is changed. King states that the target can be moved relative to the location of the primary ion beam at a speed necessary to make a transition region.

U.S. Pat. No. 5,240,583, issued Aug. 31, 1993 to Ahonen, entitled "Apparatus To Deposit Multilayer Films", assigned to the same assignee as the instant application, discloses an apparatus to deposit thin films on a substrate. An ion beam produced by an ion gun which is radio frequency excited impinges upon a target. The target is translatable laterally by a target holder to bring different target materials into contact with the ion beam. The targets are held at an angle to the ion beam. The target material sputtered off the target by collision with the ions is deposited on substrates held above the targets. The substrates are moved into and out of the path of the sputtered material by a rotating device for uniform deposition of the sputtered material.

Ring laser gyro mirrors must maintain low absorption loss despite long exposures to plasma environments used to provide lasing action in, for example, ring laser gyros. Resistance to plasma-induced increases of absorption loss may be achieved by mirrors composed of multiple optical regions of zirconia ($ZrO_2$) and silica ($SiO_2$), where the $ZrO_2$ material is doped with a well-known glass forming material such as a small percentage of $SiO_2$ to minimize crystallization during deposition and subsequent post deposition annealing operations. A high plasma resistance of such a mirror is obtained when the last material, that is, the outermost one, comprises $ZrO_2$, and not $SiO_2$. But such $ZrO_2$-topped mirrors, as conventionally made, possess surface properties which make them very difficult to clean. In particular, very small particulate contamination poses significant cleaning problems for such mirrors. It is well known that large amounts of such surface particulates are detrimental to ring laser gyro performance.

FIG. 1 shows the outermost part of a conventional mirror. FIG. 1 shows a high reflectance mirror 5 of the type employed in laser devices such as, for example, ring laser gyros. Those skilled in the art will recognize a typical configuration of zirconium oxide ($ZrO_2$) 10 over a mirror structure 12 comprising, for example, silicon dioxide ($SiO_2$). Those skilled in the art will also recognize that, while several of the optical quarterwave structures are shown, this is for illustrative purposes only and that many more alternating regions may be deposited and are typically deposited on such mirrors. Deposition of the alternating optical regions may be accomplished by any well-known means such as by electron beam deposition processes or ion beam deposition. The multiple region mirror 5 structure is topped with a final coating of $ZrO_2$ 10 having a surface 20 with no overcoat thereon.

FIG. 2a shows a multiple optical region mirror 15, with the addition of a thin coating 22 of $SiO_2$ on the top surface 20 of the final $ZrO_2$ coating 10. Such mirrors have been made by Honeywell Incorporated of Minneapolis, Minn. USA with an overcoat thickness of less than 150 angstroms and at least about 100 angstroms. This $SiO_2$ overcoat is not thick enough to appreciably alter the optical properties of the structure, but returns the surface to the cleaning behavior of conventional glass. Unfortunately, it has been learned that mirrors such as mirror 15 shown in FIG. 2a may sometimes suffer from a lack of plasma resistance if the thickness of the overcoat region 22 of $SiO_2$ is equal to or greater than about 100 angstroms. Also such mirrors do not exhibit the desired long life characteristics of mirrors made without such an overcoat surface.

SUMMARY OF THE INVENTION

In contrast to the prior art, in one aspect the present invention provides a mirror for a ring laser gyro. The mirror includes a plurality of alternating optical quarterwave regions of $SiO_2$ and $ZrO_2$. The plurality of alternating regions have first and second thicknesses suitable for reflecting a laser beam in a ring laser gyro. A final top coating of $ZrO_2$ and $SiO_2$ is constructed so as to be made substantially of $ZrO_2$ at a bottom portion and so as to have gradually increasing $SiO_2$ content so that a top surface of the final top coating comprises substantially pure $SiO_2$ material.

In another aspect of the invention the final coating of $ZrO_2$ is doped so as to provide a top material of sufficient glass-like property to promote improved cleanability of the top surface of the mirror.

In yet another aspect of the invention an overcoat region of $SiO_2$ is deposited on the top surface of $ZrO_2$ wherein the overcoat region of $SiO_2$ has a thickness of about 10 angstroms but less than about 25 angstroms.

In contrast to the prior art the present invention discloses several methods of modifying a top $ZrO_2$ material to facilitate cleaning of the surface of such ring laser gyro mirrors.

BRIEF DESCRIPTION OF THE DRAWINGS

FIG. 1 shows a high reflectance ring laser gyro mirror of the prior art.

FIG. 2a shows another example of a high reflectance mirror having a region of SiO₂ over the top surface.

FIG. 2b shows an example of a high reflectance ring laser gyro mirror including a substantially pure SiO₂ top surface.

FIG. 2c shows an alternative embodiment of the present invention wherein the top material of a high reflectance ring laser gyro mirror is doped throughout.

FIG. 2d shows an alternative embodiment of a high reflectance mirror wherein a top material of ZrO₂ is doped in graduated amounts in accordance with the present invention.

DETAILED DESCRIPTION OF THE PREFERRED EMBODIMENT

Figure 3C:
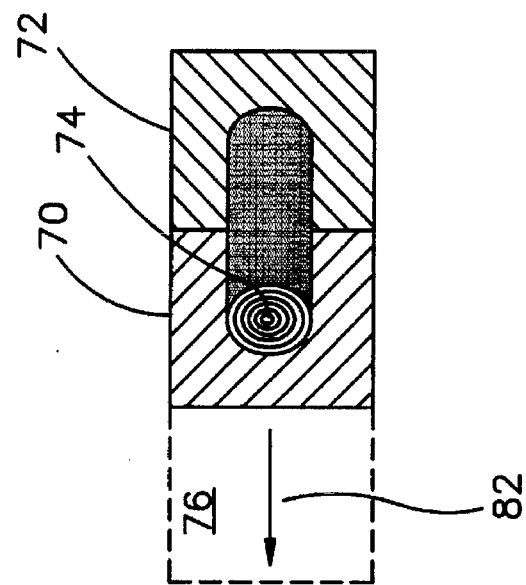
FIGS. 3a, 3b and 3c show a processing method and apparatus as provided by the present invention for fabricating high reflectance optical mirrors with alternating quarterwave optical regions of higher and lower refractive indices.

Referring now to FIG. 2a, one embodiment of a high reflectance mirror 15 having a top surface 22 of pure SiO₂ is shown. In mirror 25 of FIG. 2b, the ZrO₂/SiO₂ ratio is altered toward the end of the final cycle, gradually increasing the SiO₂ content so that the ultimate surface is composed of essentially pure SiO₂. This alteration of the content of the top material 50 may be accomplished using well known deposition techniques, or as explained below with reference to FIGS. 3a–3c.

Referring now to FIG. 2c, a high reflectance mirror 35 manufactured by a third method of modifying the top ZrO₂ region 52 for enhanced cleaning is shown. In this example, the top ZrO₂ coating 52 is doped with atoms or molecules added to the deposition chamber environment during this final deposition. Such dopants include hydrogen and water, and provide a change in the top coating such that readily-cleaned surfaces result. The doping can be essentially continuous during the deposition of the final material to arrive at a uniformly distributed doped top ZrO₂ region 52.

Now referring to FIG. 2d, an alternate embodiment of the invention is shown. A top coating of ZrO₂ 54 is shown capping off the high reflectance mirror 45. The top material of ZrO₂ 54 comprises a deposited thickness of ZrO₂ with gradually increasing amounts of dopant as shown by dopant thicknesses 56, 58 and 60. The top-most coating 54 comprises a first undoped thickness of ZrO₂ 55, a second slightly doped thickness of ZrO₂ 56, a third more heavily doped thickness of ZrO₂ 58, and a final heavily doped top coating of ZrO₂ 60. Such doping need not be deposited in discrete steps but may be a continuous gradual increase of doping in the top coating from surface 62 of the last SiO₂ material, for example.

Referring again to FIG. 2a, it has been subsequently demonstrated that a very thin coating of SiO₂ 22 on the order of about 10 angstroms may avoid the problems with absorption loss experienced with coatings of 100 angstroms or more as used in the prior art. Therefore, an improved mirror may be constructed having a thin SiO₂ region 22 of at least about 10 angstroms but less than about 100 angstroms.

In any of the methods presented, small changes in the optical properties, including transmission properties, that are larger than desired can be compensated for by adjustment of the underlying mirror structure, using conventional and well known techniques.

In addition, the thin modified structures at the mirror surface region can suffer some increased loss responses to plasma environments. This undesired absorption loss can be minimized by adjusting the optical phase behavior of the mirror structure such that the loss region is positioned at the center of the null field of the standing waves of the lasing light beam.

Figure 3B:
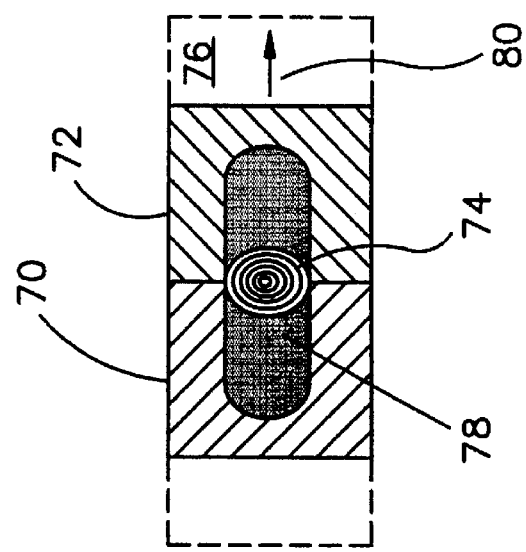
Figure 3A:
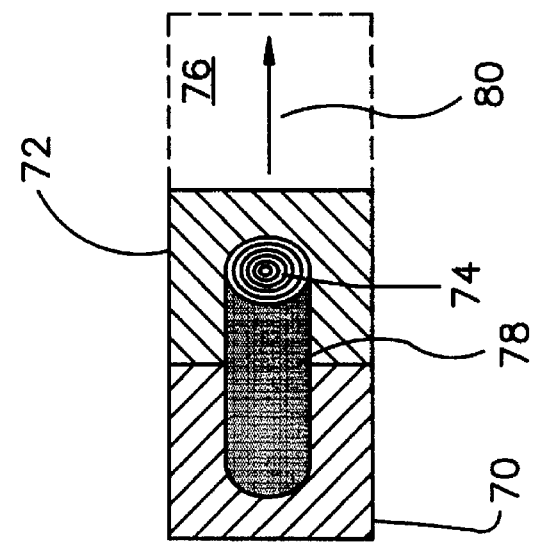

Referring now to FIGS. 3a, 3b and 3c, one example of the method of the invention for fabricating an optical structure for a high reflectance mirror is schematically shown. Shown are a first target 72, a second target 70, an ion beam position 74, a target translation region 76, and a sputtering region 78. The target translation region 76 is generally defined by the broken lines in FIGS. 3a, 3b and 3c. The targets may be any conventional targets used for sputtering in the fabrication of multiple optical region mirrors. In operation, the targets are slowly translated through the sputtering region 78 of ion beam impingement with the ion beam continuously on and fixed at ion beam position 74. This translational method necessarily produces co-deposition from both targets during a period of the target-to-target transition as is best shown in FIG. 3b. Target-to-target transition occurs when the ion beam position overlaps both targets. The resulting refractive index of the deposited material will vary smoothly from that corresponding to one target to that corresponding to the other target. The extent of the region of smoothly varying refractive index depends on the deposition rate onto the substrate, the speed with which the target-to-target translations are performed, and on the effective target area being sputtered at any time.

Referring now to FIGS. 3a, 3b, and 3c, a transition of the first and second targets 72, 70 respectively, in the direction of arrow 80 is shown in FIGS. 3a and 3b. The transitional period of time where the ion beam position overlaps both the first and second targets 72, 70, is represented in FIG. 3b. In FIG. 3c the targets 72, 70 have completed their transition from left to right looking at the page and after an appropriate period of deposition from target 70, may now proceed in the opposite direction as indicated by arrow 82 through the left-hand portion of the transition region 76. In this way the targets transition in an oscillating fashion until as many optical regions as desired are stacked onto an optical mirror substrate.

The invention has been described herein in considerable detail in order to comply with the Patent Statutes and to provide those skilled in the art with the information needed to apply the novel principles and to construct and use such specialized components as are required. However, it is to be understood that the invention may be carried out by specifically different equipment and devices, and that various modifications, both as to the equipment details and operating procedures, may be accomplished without departing from the scope of the invention itself.

What is claimed is:

1. A ring laser gyro mirror comprising:
   a) a plurality of alternating optical coatings of SiO₂, and of ZrO₂, and of admixtures of one another, wherein the plurality of alternating optical coatings are comprised of thicknesses suitable for reflecting a laser beam in a ring laser gyro;
   b) the plurality of alternating optical regions comprising a top material of ZrO₂ having a top surface; and
   c) an overcoat region of SiO₂ deposited on the top surface of ZrO₂ wherein the overcoat region of SiO₂ has a thickness of about 10 angstroms but less than about 25 angstroms.

2. A mirror for a ring laser gyro comprising:
   a) a plurality alternating optical coatings of SiO₂ and of ZrO₂, and of admixtures of one another, wherein the plurality of alternating optical coatings are comprised of thicknesses suitable for reflecting a laser beam in a ring laser gyro; and b) a final coating of $ZrO_2$ and $SiO_2$, and admixtures of one another, which is constructed so as to be comprised substantially of $ZrO_2$ at a bottom portion and so as to gradually increase $SiO_2$ content so that a top surface of the final coating comprises substantially pure $SiO_2$ material.

3. A mirror for ring laser gyro comprising:

a) a plurality of alternating optical regions of $SiO_2$ and of $ZrO_2$, and of admixtures of one another, wherein the plurality of alternating optical regions are comprised of thicknesses suitable for reflecting a laser beam in a ringer laser gyro; and b) wherein a final product mirror is defined by the plurality of alternating optical regions that includes a final coating of doped $ZrO_2$ wherein the final coating of $ZrO_2$ is doped to provide an air side surface to promote improved cleanability of an air side mirror surface.

4. The mirror of claim 3 wherein the final coating of $ZrO_2$ is doped with a material selected from the group consisting of hydrogen and water.

5. The mirror of claim 3 wherein doping of the final coating material is uniform throughout the final coating.

6. The mirror of claim 3 wherein doping of the final coating material is gradually uniformly increased from a bottom region of the final coating to a top region of the final coating.

7. The mirror of claim 3 wherein doping of the top coating is gradually increased from a bottom region of the final coating to a top region of the final coat.

8. The mirror of claim 5 wherein the final coating of $ZrO_2$ is doped with a material selected from the group consisting of hydrogen and water.

9. The mirror of claim 6 wherein the final coating of $ZrO_2$ is doped with a material selected from the group consisting of hydrogen and water.

10. The mirror of claim 7 wherein the final coating of $ZrO_2$ is doped with a material selected from the group consisting of hydrogen and water.

11. A method for fabricating a mirror comprising the steps of:

a) depositing a plurality of alternating optical regions of $SiO_2$, and $ZrO_2$, and of admixtures of one another, wherein the plurality of alternating regions are comprised of thicknesses suitable for reflecting a laser beam, and wherein the plurality of alternating regions are arranged to comprise a final coating of $ZrO_2$ having a top surface; and b) depositing an overcoat region of $SiO_2$ on the top surface of $ZrO_2$, and of admixtures of one another, wherein the overcoat region of $SiO_2$ has a thickness of about 10 angstroms but less than about 25 angstroms.

12. A method for fabricating a mirror comprising the steps of:

a) fabricating a plurality of alternating optical regions of $SiO_2$ and $ZrO_2$, and of admixtures of one another, wherein the plurality of alternating optical regions are fabricated to be comprised of thicknesses suitable for reflecting a laser beam in a ring laser gyro; and b) fabricating a final coating of $ZrO_2$ and $SiO_2$, and of admixtures of one another, so as to be comprised substantially of $ZrO_2$ at a bottom portion and so as to gradually increase $SiO_2$ content so that a top surface of the final coating comprises substantially pure $SiO_2$ material.

13. A method for fabricating a mirror comprising the steps of:

a) fabricating a plurality of alternating optical regions of $SiO_2$ and $ZrO_2$ and of admixtures of one another, wherein the plurality of alternating optical regions are fabricated to be comprised of thicknesses suitable for reflecting a laser beam;

b) fabricating a final coating of $ZrO_2$; and c) doping the final coating of $ZrO_2$ with a material selected from the group consisting of hydrogen and water to provide an air side mirror surface with improved cleanability of an air side mirror surface region.

14. A ring laser gyro mirror comprising:

a) a plurality or alternating optical coatings of $SiO_2$, an of $ZrO_2$, and of admixtures of one another, wherein the plurality of alternating optical coatings are comprised of thicknesses suitable for reflecting a laser beam in a ring laser gyro;

b) the plurality of alternating optical regions comprising a material of an admixture of $ZrO_2$ and $SiO_2$ having a top surface; and c) an overcoat region of $SiO_2$ deposited on the top surface of $ZrO_2$ wherein the overcoat region of $SiO_2$ has a thickness of about 10 angstroms but less than about 25 angstroms.

* * * * *

UNITED STATES PATENT AND TRADEMARK OFFICE
CERTIFICATE OF CORRECTION

PATENT NO. : 5,646,780
DATED : July 8, 1997
INVENTOR(S) : Thomas M. Crook/Randy J. Ramberg It is certified that error appears in the above-indentified patent and that said Letters Patent is hereby corrected as shown below:

Column 4, line 66, insert "of" after --plurality--

Column 6, line 35, replace "an of" with --and of--

Signed and Sealed this

Seventh Day of October, 1997

Attest:

BRUCE LEHMAN

Attesting Officer

Commissioner of Patents and Trademarks